United States Patent [19]

Simpson, Jr. et al.

[11] Patent Number: 5,000,552
[45] Date of Patent: Mar. 19, 1991

[54] OPTICAL SYSTEM FOR USE IN PHOTOGRAPHIC DEVICES

[75] Inventors: John M. Simpson, Jr., Webster; Robert P. Cloutier, Spencerport, both of N.Y.

[73] Assignee: Eastman Kodak Company, Rochester, N.Y.

[21] Appl. No.: 527,529

[22] Filed: May 23, 1990

Related U.S. Application Data

[62] Division of Ser. No. 312,156, Feb. 21, 1989, Pat. No. 4,932,764.

[51] Int. Cl.$^5$ ............................................. G02B 9/08
[52] U.S. Cl. .................................... 350/480; 350/450
[58] Field of Search .................... 350/479, 450, 480

[56] References Cited

U.S. PATENT DOCUMENTS

| | | | |
|---|---|---|---|
| 55,195 | 5/1866 | Zentmayer | 350/474 |
| 1,082,678 | 12/1913 | Casler | 350/412 X |
| 2,586,418 | 9/1950 | Davis | 350/450 |
| 3,006,248 | 9/1958 | Linke et al. | 354/202 |
| 4,932,764 | 6/1990 | Simpson, Jr. | 350/450 |

OTHER PUBLICATIONS

Lens Design Fundamentals, Rudolf Kingslake, Pub. by Academic Press, 1978, pp. 49–55.

Primary Examiner—Bruce Y. Arnold
Assistant Examiner—Rebecca D. Gass
Attorney, Agent, or Firm—Svetlana Z. Short

[57] ABSTRACT

An optical system comprising two plastic elements is suitable for use in very low cost, wideangle cameras having curved image surfaces. This system has low distortion across a curved field angle of 65 degrees or more.

14 Claims, 1 Drawing Sheet

OPTICAL SYSTEM FOR USE IN PHOTOGRAPHIC DEVICES

CROSS REFERENCE TO RELATED APPLICATIONS

This application is a division of U.S. Application Ser. No. 07/312,156, AN OPTICAL SYSTEM FOR USE IN PHOTOGRAPHIC DEVICES in the name of John Mattinson Simpson, Jr., filed Feb. 21, 1989, now U.S. Pat. No. 4,932,764.

BACKGROUND OF THE INVENTION

1. Field of the Invention

This invention relates to simple two element wide angle optical systems.

2. Description Relative to the Prior Art

A two-element camera objective lens system with a curved image surface was disclosed in U.S. Pat. Specification 1,082,678. The lens system therein disclosed worked with "a flexible film used for making the negative to conform more accurately to a focal surface of the lens, with consequent improvement in the definition of the image." According to the inventor of U.S. Pat. Specification No. 1,082,678, the curved image surface was largely introduced to compensate for "spherical aberration". The inventor did not teach how to design a lens that is best suited for imaging an object onto a curved image surface. U.S. Pat. No. 3,006,248 by W. R. Linke (issued in 1961) discloses an objective for a camera having a cylindrical image surface and comprises two meniscus lenses. The disclosed lens system, "while of the symmetrical type is not completely symmetrical". It has a rear landscape lens with a meniscus corrector lens in front. The power of the front lens is weaker than the power of the second lens. This lens system does not compensate for distortion introduced by the cylindrical image surface.

Proposals have been made for systems including two different asymmetrically located lenses. For example, U.S. Pat. No. 55,196 (J. Zentmayer, 1866) disclosed a doublet made of meniscus lenses of different curvatures, its exterior surfaces concentric and arranged around an aperture stop. The photograPhic system disclosed in U.S. Pat. No. 55,196 was designed to have a wide field of view and utilized a planar (i.e., uncurved) focal plane. The draw-back of this system, according to Zentmayer is that "The lenses must of necessity be thin." FIGS. 1 through 3 of U.S. Pat. No. 55,196 show lenses that look like thin shells. Such lenses are generally difficult to make with conventional equipment, thus making them very expensive. In addition this lens is not intended for use with a curved image surface.

In his book, *Lens Design Fundamentals*, Dr. R. Kingslake teaches how to design a periscopic lens. This lens system is obtained by placing two identical landscape lenses symmetrically about a central stop. The periscopic lens has little distortion, lateral color (sometimes referred to as a lateral chromatic aberration) and coma, but has spherical aberration, astigmatism and Petzval field curvature. This lens is intended for use with a flat image plane because the tangential field curvature is nearly flat. Such a lens system will have very small distortion because it is symmetrical. If the film surface is curved then the resulting picture will have large distortion. An example of a periscopic lens is disclosed in U.S. Pat. specification No. 2,586,418 (J.K. Davis, 1952).

SUMMARY OF THE INVENTION

An object of the present invention is to produce a very inexpensive wide angle optical system for a camera.

Although the above and other literature has suggested two element, symmetrical and asymmetrical optical systems for nearly a century, it has become extinct as an ordinary camera objective for the last fifty years. It has not been thought to be enough better than a single miniscus lens to warrant its extra cost. Similarly, the conventional airspaced Cooke triplet has been thought to be so much superior in quality to a doublet that virtually all inexpensive camera lenses are either one or three element systems.

However, I have found that an optical system with two plastic elements separated by a stop, and working with a curved image surface has a significant advantage over the single element system when working to field angles of 65 degrees and beyond. A two element system is similar to a singlet in that it is very much cheaper to manufacture than a triplet, but it provides a acceptable image at wide angles that are impossible for the singlet at the comparable aperture. This has opened up a remarkable new use for such a lens in very inexpensive cameras having a large aspect ratio.

BRIEF DESCRIPTION OF THE DRAWINGS

Several embodiments of the Present invention will now be described, by way of example, with reference to the accompanying drawings, in which.

Similar features in each of the embodiments are given the same numeral but with a different suffix.

DETAILED DESCRIPTION OF THE PREFERRED EMBODIMENT

Figure 1:
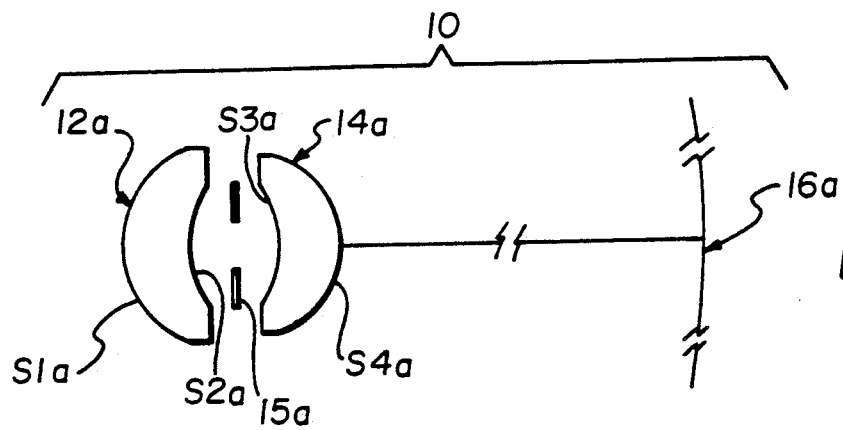
FIG. 1 shows the outline of the optical system in a first embodiment.
Figure 2:
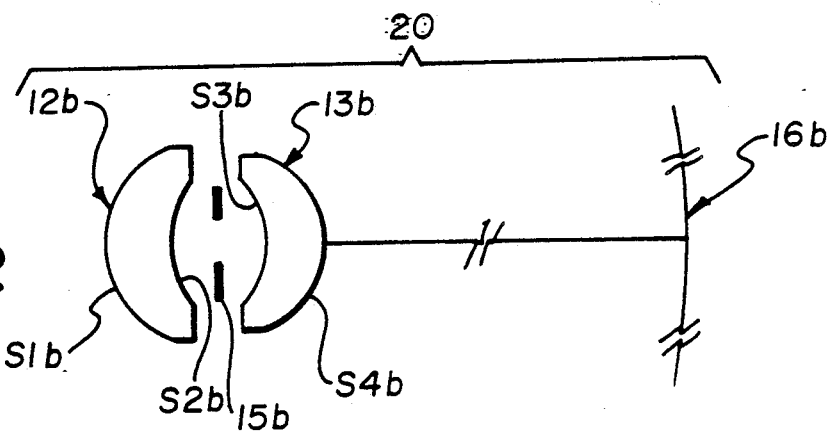
FIG. 2 shows the outline of the optical system in a second embodiment.
Figure 3:
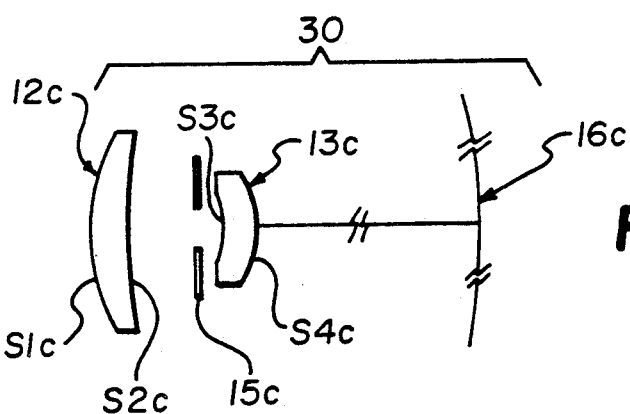
FIG. 3 shows the outline of the optical system in a third embodiment.
Figure 4:
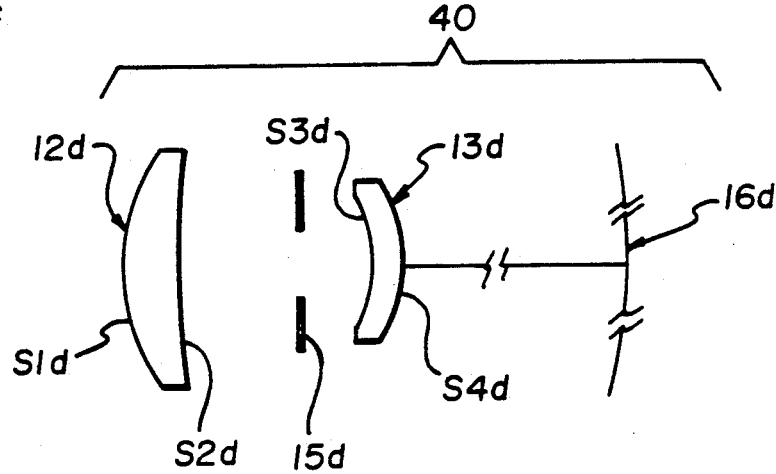
FIG. 4 shows the outline of the optical system in a fourth embodiment.

The following embodiments of the present invention consist of an optical system imaging an object on a cylindrical image surface 16. The optical system comprises an aperture stoP 15 and two different lenses 12 and 14, disposed at the front and at the rear, respectively. The front lens 12 functions as a landscape lens and the rear lens 14 functions as a meniscus corrector. The front lens 12 has a shorter focal length than the rear lens 14. In some of the embodiments the lenses 12 and 14 are disposed asymmetrically relative to the stop 15. In the first embodiment, the focal length of optical system 10 is 24 mm., the F number is 11 and the full field of view is 77.5 degrees. Since the amount of astigmatism is reduced when optical elements become thicker, the optical system 10 has an excellent performance due to relative thickness of lenses 12a and 14a. Both of lenses 12a and 14a are made from the same type of plastic; therefore, lateral color in lens system 10 is not corrected.

The second embodiment is very similar to the first. Optical system 20 is constructed from two relatively thick meniscus lenses 12b and 14b. However, lateral color is corrected because the lens systems is designed with two different materials for its elements.

In the third embodiment, the focal length of optical system 30 is 25 mm., the F number is 11 and the full field of view is 75.8 degrees. Optical system 30 has better illumination in the corner than optical system 10. It is also cheaper to manufacture due to thinner elements. Lenses in oPtical system 30 are made from two different plastics.

In the fourth embodiment, the focal length of the optical system 40 is 36 mm., the F number is 8 and the full field of view is 62.6 degrees. Lenses 12d and 13d of the system 40 are made from the same plastic. Optical system 40 is less expensive to manufacture than systems 10 and 20 due to thinner lenses 12d and 13d.

The following are the numerical examples of embodiments 1 through 4:

EXAMPLE 1

| SURFACE | R | D | REFRACTIVE INDEX | Abbe V NUMBER |
|---|---|---|---|---|
| S1a | 5.56538 | 3.920 | 1.492 | 57.4 |
| S2a | 7.11637 | 2.519 | | |
| Diaphragm | | 2.519 | | |
| S3a | −5.33878 | 3.352 | 1.492 | 57.4 |
| S4a | −5.14086 | | | |

EXAMPLE 2

| SURFACE | R | D | REFRACTIVE INDEX | Abbe V NUMBER |
|---|---|---|---|---|
| S1b | 5.8262 | 3.7595 | 1.494 | 57.6 |
| S2b | 7.5995 | 2.925 | | |
| Diaphragm | | 2.925 | | |
| S3b | −5.5167 | 2.888 | 1.595 | 31.2 |
| S4b | −5.4769 | | | |

EXAMPLE 3

| SURFACE | R | D | REFRACTIVE INDEX | Abbe V NUMBER |
|---|---|---|---|---|
| S1c | 12.0211 | 2.000 | 1.492 | 57.4 |
| S2c | 29.4280 | 3.795 | | |
| Diaphragm | | 1.495 | | |
| S3c | −9.44980 | 1.633 | 1.590 | 30.9 |
| S4c | −7.56870 | | | |

EXAMPLE 4

| SURFACE | R | D | REFRACTIVE INDEX | Abbe V NUMBER |
|---|---|---|---|---|
| S1d | 14.2440 | 2.500 | 1.492 | 57.4 |
| S2d | 31.8270 | 6.740 | | |
| Diaphragm | | 3.545 | | |
| S3d | −12.8370 | 2.047 | 1.492 | 57.4 |
| S4d | −10.2400 | | | |

Where R is the radius of curvature for a surface, and D stands for axial thickness and air separations.

While in the embodiments specifically described above all of the surfaces are spherical, it is to be understood that other embodiments of this invention may have nonspherical surfaces. It is also to be understood that other embodiments of the present invention may be scaled up or down.

Also, it should be obvious that weak spherical components which do not significantly alter third order aberration corrections or the like might also be employed, but the term "element" is not intended to include such components for purposes of the present application.

Optical systems in accordance with the present invention are particularly well suited for use in cameras which create large aspect ratio images, with the larger dimension of the image area being curved in conformity with the cylindrical image surface.

The invention has been described in detail with particular reference to a presently preferred embodiment, but it will be understood that variations and modifications can be effected within the spirit and scope of the invention.

What is claimed is:

1. A wide angle optical system for use in a low cost wide angle camera having an image surface curved toward said optical system, said system comprising an aperture stop and two single element plastic lenses, one lens disposed in front of said aperture stop and the other disposed behind said aperture stop, said optical system having a curved image corresponding substantially to the curved image surface of the camera through a full field angle of at least 65 degrees.

2. An optical system according to claim 1 wherein said curved image has low distortion through a full field angle of at least 65 degrees.

3. An optical system having a image surface curved toward the optical system, said optical system being characterized by low distortion over a full field angle of at least 65 degrees, and comprising two single element plastic lenses and an aperture stop, said aperture stop being positioned between said two lenses, one of said lenses being disposed at the front of said aperture stop and the other being disposed at the rear of said aperture stop, said front lens having a convex front surface and a concave front surface and a convex rear surface.

4. A wide angle optical system according to claim 1 or 3 wherein both said front lens and said rear lens are made from the same optical plastic.

5. An optical system according to claim 4, wherein the index of refraction of both lenses is 1.49 and the Abbe V number is 57.4.

6. An optical system as claimed in claim 4, wherein each lens fulfills the following two requirements:

1 mm. < CT < 4 mm.

0.6 mm. < ET < 3.9 mm.

where CT is the center thickness of the element and ET is the edge thickness of the element.

7. An optical system according to claim 4 wherein said curved image has low distortion through a full field angle of at least 65 degrees.

8. An optical system according to claim 1 or 2, wherein an index of refraction of at least one of the lenses is 1.49 and the Abbe V number of this lens is 57.4.

9. An optical system as claimed in claim 8, wherein each lens fulfills the following two requirements:

1 mm. < CT < 4 mm.

0.6 mm. < ET < 3.9 mm.

where CT is the center thickness of the element and ET is the edge thickness of the element.

10. An optical system according to claim 8 wherein said curved image has low distortion through a full field angle of at least 65 degrees.

11. An optical system as claimed in claim 5, wherein each lens fulfills the following two requirements:

1 mm. < CT < 4 mm.

0.6 mm. < ET < 3.9 mm.

where CT is the center thickness of the element and ET is the edge thickness of the element.

12. An optical system according to claim 5 wherein said curved image has low distortion through a full field angle of at least 65 degrees.

13. An optical system as claimed in claims 1 or 3, wherein said lenses are asymmetrically located relative to said stop.

14. An optical system as claimed in claim 1, or 3, wherein each lens fulfills the following two requirements:

1 mm. < CT < 4 mm.

0.6 mm. < ET < 3.9 mm.

where CT is the center thickness of the element and ET is the edge thickness of the element.

* * * * *

UNITED STATES PATENT AND TRADEMARK OFFICE
CERTIFICATE OF CORRECTION

PATENT NO. : 5,000,552
DATED : March 19, 1991
INVENTOR(S) : John M. Simpson, Jr., et. al.

It is certified that error appears in the above-indentified patent and that said Letters Patent is hereby corrected as shown below:

Column 1, Line 45 -   after the word "The", "photograPhic" should be --photographic--.

Column 2, Line 22 -   after the word "provides", "a" should be --an--.

Column 2, Line 29 -   after the word "the", "Present" should be --present--.

Column 2, Line 48 -   after the word "aperture", "stoP" should be --stop--.

Column 3, Line 6 -    after the word "in", "oPtical" should be --optical--.

UNITED STATES PATENT AND TRADEMARK OFFICE
CERTIFICATE OF CORRECTION

PATENT NO. : 5,000,552
DATED : March 19, 1991
INVENTOR(S) : John M. Simpson, Jr., et. al.

It is certified that error appears in the above-indentified patent and that said Letters Patent is hereby corrected as shown below:

Column 4, line 42 -   after the word "concave", the following should be inserted--rear surface; and said rear lens having a concave--.

Signed and Sealed this

Twenty-eighth Day of September, 1993

Attest:

BRUCE LEHMAN

*Attesting Officer*      Commissioner of Patents and Trademarks